United States Patent [19]

De Vos et al.

[11] Patent Number: 5,368,769
[45] Date of Patent: * Nov. 29, 1994

[54] MANUFACTURE OF CELLULAR POLYMERS AND COMPOSITIONS THEREFOR

[75] Inventors: Rik De Vos, Rotselaar; Jan W. Leenslag, Tremelo, both of

[73] Assignee: Imperial Chemical Industries PLC, London, England

[*] Notice: The portion of the term of this patent subsequent to Oct. 18, 2011 has been disclaimed.

[21] Appl. No.: 67,789

[22] Filed: May 27, 1993

Related U.S. Application Data

[60] Division of Ser. No. 974,352, Nov. 10, 1992, Pat. No. 5,240,965, which is a continuation of Ser. No. 852,070, Mar. 16, 1992, abandoned.

[30] Foreign Application Priority Data

| | | | |
|---|---|---|---|
| Apr. 3, 1991 | [GB] | United Kingdom | 9106967.4 |
| Jun. 12, 1991 | [GB] | United Kingdom | 9112622.7 |
| Aug. 16, 1991 | [GB] | United Kingdom | 9117749.3 |
| Nov. 1, 1991 | [GB] | United Kingdom | 9123205.8 |
| Dec. 24, 1991 | [GB] | United Kingdom | 9127335.9 |

[51] Int. Cl.$^5$ ............................................. C09K 3/00
[52] U.S. Cl. ........................... 252/182.2; 252/182.24; 252/182.25; 252/182.26; 252/182.27; 521/131; 521/132; 521/51
[58] Field of Search .......... 252/182.2, 182.24, 182.25, 252/182.26, 182.27; 521/132, 131

[56] References Cited

U.S. PATENT DOCUMENTS

| | | | |
|---|---|---|---|
| 4,981,879 | 1/1991 | Snider | 521/131 |
| 5,162,384 | 11/1992 | Owens et al. | 521/110 |
| 5,210,106 | 5/1993 | Dams et al. | 521/131 |
| 5,211,873 | 5/1993 | Dams et al. | 521/131 |

FOREIGN PATENT DOCUMENTS

| | | |
|---|---|---|
| 0355713 | 2/1990 | European Pat. Off. . |
| 0405439 | 1/1991 | European Pat. Off. . |
| 3000743 | 1/1991 | Japan . |
| 3000744 | 1/1991 | Japan . |
| 3000745 | 1/1991 | Japan . |
| 3000746 | 1/1991 | Japan . |
| 1589562 | 5/1981 | United Kingdom . |
| 2225030 | 6/1990 | United Kingdom . |

*Primary Examiner*—Morton Foelak
*Attorney, Agent, or Firm*—Cushman, Darby & Cushman

[57] ABSTRACT

A method for the preparation of a flexible foam, an integral skin foam or a microcellular elastomer by reacting an organic polyisocyanate and an isocyanate-reactive composition comprising at least one isocyanate-reactive compound of molecular weight of 1000 to 10000 and a functionality of 2 to 4 in the presence of a blowing agent, characterized in that the reaction is conducted in the presence of an inert, insoluble, organic liquid which has a boiling point of at least 60° C. at 1 bar. CFC-free foams and elastomers of good quality are obtainable.

12 Claims, No Drawings

MANUFACTURE OF CELLULAR POLYMERS AND COMPOSITIONS THEREFOR

This is a division of application Ser. No. 07/974,352, filed Nov. 10, 1992, now U.S. Pat. No. 5,240,965, which is a continuation of Ser. No. 07/852,070, filed Mar. 16, 1992, now abandoned.

The present invention is concerned with a novel polyisocyanate composition, a novel polyol composition, a novel process for preparing a flexible foam, an integral skin foam or a microcellular elastomer and the use of a special class of liquids in preparing such foams and elastomers.

Such foams and elastomers in general are made by reacting an appropriate polyisocyanate and isocyanate-reactive composition in the presence of a blowing agent. One of the blowing agents most widely used has been trichloro-fluoromethane (CFC-11) due to its favourable combination of properties.

Recently it was found that chlorofluorocarbon blowing agents like CFC-11, might deplete the ozone layer around the earth. Because of this concern it was agreed internationally to aim at phasing out the production and use of such ozone depleting compounds as soon as possible. Therefore there is a need to find an alternative which on the one hand is environmentally more acceptable and which on the other hand does not influence the properties of such foam or elastomer in a negative way.

Surprisingly, we have found that by using a special class of liquids in preparing the above foams and elastomers, a material may be obtained having improved properties.

Consequently, the present invention is concerned with the use of a liquid for the preparation of a method for the preparation of a flexible foam, an integral skin foam or a microcellular elastomer by reacting an organic polyisocyanate and an isocyanate-reactive composition comprising at least one isocyanate-reactive compound having a molecular weight of 1000 to 10000 and a functionality of 2 to 4 in the presence of a blowing agent, characterised in that the reaction is conducted in the presence of an inert, insoluble, organic liquid which has a boiling point of at least 60° C. at 1 bar.

The inert, insoluble, organic liquid can be combined with the polyisocyanate and/or with the polyol before the polyisocyanate and the polyol are combined to form the foam or the elastomer. Therefore the present invention is further concerned with a polyisocyanate composition comprising a liquid as defined above and with a polyol composition comprising a liquid as defined above. Still further the invention is concerned with the use of these inert, insoluble, organic liquids in the preparation of these foams and elastomers.

"Inert" as used before and hereinafter is defined as "showing no reactivity towards the other ingredients of the reaction mixture and especially towards isocyanate-reactive compositions and polyisocyanates, under storage and reaction conditions".

"Insoluble" as used before and hereinafter is defined as "showing a solubility in isocyanate-reactive composition and polyisocyanate of less than 500 ppm by weight at 25° C. and 1 bar".

"Liquid" as used before and hereinafter means "liquid under foam-forming conditions and preferably at ambient conditions".

The inert, insoluble, organic liquid having a boiling point of at least 60° C. and preferably at least 75° C. at 1 bar may be selected from fluorinated organic compounds and preferably is selected from the group consisting of fluorinated hydrocarbons, fluorinated ethers, fluorinated tertiary amines, fluorinated amino-ethers and fluorinated sulfones.

"A fluorinated compound" as mentioned above and hereinafter is defined as "a compound wherein at least 75% and preferably at least 90% and most preferably at least 99% of the hydrogen atoms have been replaced by fluorine atoms. This definition is only related to fluorinated inert, insoluble, organic liquids having a boiling point of at least 60° C. at 1 bar.

The fluorinated hydrocarbons in general have at least 7 carbon atoms. They may be cyclic or non-cyclic, aromatic or aliphatic and saturated or unsatured. Examples of fluorinated hydrocarbons are the fluorinated versions of norbornadiene, decaline, dimethylcyclohexane, methylcyclohexane, 1-methyl decaline, phenantrene, heptane, octane, nonane and cyclooctane.

The fluorinated ethers may be cyclic or acyclic and include for instance fluorinated propyltetrahydrofuran and fluorinated butyltetrahydrofuran. Suitable commercially available fluorinated ethers include Galden HT 100, HT 200, HT 230, HT 250 and HT 270 all from Montefluos SpA (Galden is a trade mark) which are fluorinated polyethers.

The fluorinated amines include the fluorinated versions of trimethylamine, triethylamine, ethyldimethylamine, methyl diethylamine, tripropylamine, tributylamine, tripentylamine, N-alkylpiperidines like N-methylpiperidine.

Examples of fluorinated sulfones are $CF_3SO_2CF_3$ and $CF_3SO_2CF_2CF_3$.

Examples of suitable fluorinated amino-ethers include fluorinated N-alkyl($C_{2-6}$)morpholine like N-ethyl- and N-isopropyl morpholine.

Fluorinated and perfluorinated compounds have been proposed in the prior art as an ingredient for preparing foams. U.S. Pat. No. 4,972,002 discloses the use of low boiling fluorinated hydrocarbons for preparing foams. EP 405439 is disclosing the use of perfluorinated ethers and hydrocarbons as inflating agents for preparing rigid foams. U.S. Pat. No. 4,981,879 discloses the use of perfluorinated hydrocarbons having a boiling point of less than 215° C. for preparing rigid foams.

The inert, insoluble, organic liquid generally is used in an amount of 0.05–10 parts by weight (pbw) per 100 pbw of polyisocyanate or per 100 pbw of isocyanate-reactive composition. The amount on the whole reaction reaction mixture in general will be 0.02–5 pbw per 100 pbw of foam forming reaction system. Before the polyisocyanate and the isocyante-reactive composition are combined the inert, insoluble, organic liquid is combined with the isocyanate-reactive composition or the polyisocyanate using the above indicated amount. The mixing is conducted under high shear mixing conditions. Alternatively the inert, insoluble, organic liquid is supplied to the foam forming mixture independently from the isocyanate-reactive composition and the polyisocyanate.

The reaction between the isocyanate-reactive composition and the polyisocyanate is conducted in the presence of a blowing agent. The blowing agent preferably is combined with the polisocyanate or the isocyanate-reactive composition before they are combined to form the foam or elastomer. Therefore the present invention is also concerned with polyisocyanate and isocyanate-reactive compositions comprising an inert, insoluble, organic liquid having a boiling point of at least 60° C. at 1 bar and a blowing agent. Alternatively the blowing agent is supplied to the foam forming mixture in admixture with the isocyanate-reactive composition while the inert, insoluble, organic liquid is supplied to the foam forming mixture together with the polyisocyanate or the other way around. Further the blowing agent can be supplied to the foam forming mixture independently from the polyisocyanate and the isocyanate-reactive composition but together with the inert, insoluble, organic liquid.

The amount of blowing agent used will depend on the type of blowing agent and on the desired density and can be determined easily by those skilled in the art. In general the amount of blowing agent will be 1–15 pbw per 100 pbw of reaction system; this includes physical blowing agent and water. The amount of blowing agent in the polyisocyanate and the isocyanate-reactive composition may range from 2–30 pbw per 100 pbw of polyisocyanate or isocyanate-reactive composition with the proviso that no water is added to the polyisocyanate.

In principle every blowing agent known in the art may be used. Of course preferably no CFC blowing agent is used. Blowing agents having a boiling point between −70° C. and 0° C. and/or water are preferred since it has been found that the combined use of the inert, insoluble, organic liquid with such a blowing agent provides for superior foams and elastomers. In integral skin foams the surface appearance is improved when using these preferred blowing agents; in particular the blowing agents having a boiling point between −70° C. and 0° C. further give improved skin quality.

Very suitably the blowing agent may be selected amongst the group consisting of $CHClF_2$, $CH_2F_2$, $CF_3CH_2F$, $CF_2HCF_2H$, $CH_3CClF_2$, $C_2H_4F_2$, $C_2HF_5$, $C_2HClF_4$ and mixtures thereof. These blowing agents having a boiling point between −70° C. and 0° C. may be used together with water. Preferably no further blowing agents are used.

Another preferred blowing agent is water alone, which in particular is preferred in preparing flexible foams and microcellular elastomers.

As mentioned before the inert, insoluble, organic liquid preferably is combined with the polyisocyanate or the isocyanate-reactive composition. In order to stabilise this combination to a certain degree it is preferred to employ a surfactant in order to obtain an emulsion of this inert, insoluble, organic liquid in the polyisocyanate or the isocyanate-reactive composition.

Most preferred surfactants are fluorinated surfactants. Examples of such surfactants are fluorinated alkylpolyoxyethylene ethanols, alkylalkoxylates and alkylesters. Examples of useful fluorinated surfactants which are commercially available are Fluorad FC 430 and FC 431 from 3M; Forafac 1110D, 1157, 1157N and 1199D from Atochem and Fluowet S 3690, OTN and CD from Hoechst.

In view of the above the present invention is also concerned with a polyisocyanate and a isocyanate-reactive composition comprising an inert, insoluble, organic liquid having a boiling point of at least 60° C. at 1 bar and a surfactant, preferably a fluorinated surfactant.

The amount of surfactant used is 0.02–5 pbw per 100 pbw of foam forming reaction system and 0.05–10 pbw per 100 pbw of polyisocyanate or isocyanate-reactive composition.

The polyisocyanates and isocyanate-reactive compositions for preparing flexible foams, integral skin foams and microcellular elastomers are widely known.

Polyisocyanates which may be used according to the present invention include aliphatic, cycloaliphatic, araliphatic and aromatic polyisocyanates as proposed in the literature for use in the production of such foams and elastomers. Of particular importance are aromatic diisocyanates such as tolylene and diphenylmethane diisocyanate in the well known pure, modified and crude forms, in particular the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (polymethylene polyphenylene polyisocyanates). Preferred polyisocyanates have a number average isocyanate functionality of 2 to below 2.4.

The nature of the isocyanate-reactive compound which may be used in the present invention depends on the type of product to be prepared, i.e. microcellular elastomers, integral skin foams or flexible foams.

Suitable high molecular weight isocyanate-reactive compounds have a molecular weight of 1000 to 10000 preferably 1500–7500 and a number average functionality of 2 to 4, and include polyols, polyamines, imine-functional compounds or enamine-containing compounds and mixtures thereof.

Suitable low molecular weight isocyanate-reactive compounds have a molecular weight of 60 to below 1000 and a number average functionality of 2 to 4 and may be selected among a) polyols
b) polyamines
c) hydroxy amino compounds
d) imine-functional and/or enamine-containing compounds or mixtures thereof.

For the preparation of flexible foams, isocyanate-reactive compounds, in particular polyols, having a high molecular wehght will be used. For the preparation of integral skin foams and microcellular elastomers, mixtures of high and low molecular weight isocyanate-reactive compounds will be generally used.

Polymeric polyols have been fully described in the prior art and include reaction products of alkylene oxides, for example ethylene oxide and/or propylene oxide, with initiators containing a plurality of active hydrogen atoms per molecule. Suitable initiators include water and polyols, for example glycol, propylene glycol and their oligomers, glycerol, trimethylopropane, triethanolamine and pentaerythritol and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers polyamides, polyesteramides, polycarbonates, polyacetals, polyolefins and polysiloxanes.

Polyols having a molecular weight of 62 to below 1000 include simple non-polymeric diols such as ethylene glycol, propylene glycol, dipropylene glycol, tripropylene glycol and 1,4-butanediol.

Polyamines having a molecular weight of 1000–10000 include amino ended polyethers, polyesters, polyesteramides, polycarbonates, polyacetols, polyolefins and polysiloxanes.

Polyamines having a molecular weight of 60 to below 1000 include aliphatic, cycloaliphatic or araliphatic polyamines containing two or more primary and/or secondary amino groups, - such as the low molecular weight amino-ended polyethers -, and aromatic polyamines such as diethyl toluene diamine.

Suitable low molecular weight hydroxy-amino compounds comprise monoethanolamine, diethanolamine and isopropanol amine.

Suitable imino- or enamino functional reactants include those compounds which are derived from the modification of the above described amino-functional compounds, e.g. upon their reaction with an aldehyde or a ketone.

Mixtures of isocyanate-reactive components varying in chemical structure and/or molecular weight and/or functionality may be used if desired.

In addition to the polyisocyanate, isocyanate-reactive composition, blowing agent and insoluble, inert, organic liquid, the foam-forming reaction mixture will commonly contain one or more other conventional auxiliaries or additives. Such optional additives include foam-stabilising agents for example siloxane-oxyalkylene copolymers, urethane catalysts, for example tin compounds such as stannous octoate or dibutylin dilaurate or tertiary amines such as dimethylcyclohexaylamine or triethylene diamine, and fire retardants, for example halogenated alkyl phosphates such as tris chloropropyl phosphate.

In operating the method of the invention, the known one-shot, full-prepolymer or semi-prepolymer techniques may be used together with conventional mixing methods and the foams and elastomers may be produced in the form of mouldings, cavity fillings, sprayed foam, frothed foam or slab stock foams.

The present invention is illustrated by the following examples.

GLOSSARY

Isocyanates

VM 10 A modified MDI composition from ICI PLC, having an NCO value of 26.0% and a number average functionality of 2.07

VM 021 A modified MDI composition from ICI PLC, having an NCO value of 23.0% and a number average functionality of 2.01

VM 25 A modified MDI composition from ICI PLC, having an NCO value of 24.3% and a number average functionality of 2.21

PBA 2082 A modified MDI composition from ICI PLC, having an NCO value of 26.2 % and a number averace functionality of 2.19

Polyols

T 3275 A polyether triol from ICI PLC, having an OH value of 32 mg KOH/g.

PA 38 A polyether triol from ICI PLC, having an OH value of 36 mg KOH/g.

F 3507 A polyether triol from ICI PLC, having an OH value of 35 mg KOH/g.

MEG Monoethylene glycol.

DEG Diethylene glycol.

Catalysts

DABCO 33-LV A catalyst from Air Products. (D 33-LV)

DABCO EG A catalyst from Air Products.

NIAX -A1 A catalyst from Union Carbide.

DBTDL Dibutyl-tin-dilaurate.

Surfactant

B4113 A silicone surfactant from Goldschmidt.

FC -431 A fluorinated surfactant from 3M

Blowing agent

HCFC-22 Chloro-difluoro-methane

EXAMPLE I

Integral skin foams were prepared by using HCFC-22 as blowing agent in combination with an inert, insoluble, organic liquid: pentafluoro-2-butyl-tetrahydrofurane (PFB-THF) (boiling point: 98°–108° C. at 1 bar).

The formulations used were as follows:

A. Isocyanate compositions:

| A. Isocyanate compositions: | | |
|---|---|---|
| $A_1$ | PBA 2082 | 100 pbw |
| | PFB-THF | 3 pbw |
| | FC-431 | 0.5 pbw |
| $A_2$ | PBA 2082 | 100 pbw |
| | PFB-THF | 1.5 pbw |
| | FC-431 | 0.025 pbw |

B. Polyol composition:

| B. Polyol composition: | |
|---|---|
| T 3275 | 100 pbw |
| MEG | 8 pbw |
| D-33 LV | 1 pbw |
| $H_2O$ (non added) | 0.1 pbw |
| HCFC-22 | 5 pbw |
| The polyol composition was made by simple mixing. | |

Integral skin foams —ISF 1 and ISF2— were prepared by reacting, at an isocyanate index of 100, the polyol composition B with the polyisocyanate compositions A1 and A2 respectively.

Comparative example

An integral skin foam —$ISF_c$— was prepared by reacting PBA 2082 with polyol composition B at an isocyanate index of 100.

The reactions were performed in a mould after mixing during 10 sec. at 5000 rpm.

The physical properties of the resulting integral skin foams are shown in Table I herebelow.

The integral skin foams prepared according to the present invention showed improved skin properties and a very fine cell structure, as well as improved physical properties.

TABLE I

| | Demould time, (min.) | Density overall, (kg/m³) | Density core, (kg/m³) | Density skin, (kg/m³) | Shore A hardness, | Physical properties. Indentation hardness, (kg) | Tear strength, (N.m$^{-1}$) | Tensile strength, (kPa) | Elongation at break, (%) |
|---|---|---|---|---|---|---|---|---|---|
| ISF$_c$ | 3 | 240 | 190 | 568 | 61 | 8.2 | 2455 | 2045 | 110 |
| ISF$_1$ | 3 | 253 | 185 | 817 | 68 | 9.3 | 2880 | 2570 | 113 |
| ISF$_2$ | 3 | 256 | 198 | 818 | 73 | 11.6 | 2985 | 2640 | 122 |

EXAMPLE II

Integral skin foams were prepared as described in Example I by using water as blowing agent, in combination with inert, insoluble, organic liquids of different boiling points:

Pentafluoro-2-butyl-tetrahydrofurane (PFB-THF) (b.p. 98°–108° C. at 1 bar)

Pentafluoro-2-propyl-tetrahydrofurane (PFP-THF) (b.p. 80° C. at 1 bar)

The polyisocyanate and polyol compositions were made as in example 1 and had the following composition

A.

| A. Isocyanate compositions: | | |
|---|---|---|
| | VM10 (pbw) | pentafluoro-2-butyl THF (pbw) |
| A(1) | 97 | 3 |
| A(2) | 96 | 4 |
| A(3) | 95 | 5 |
| A(4) | 94 | 6 |
| A(5) | 93 | 7 |
| | VM10 (pbw) | pentafluoro-2-propyl THF (pbw) |
| A(6) | 97.00 | 3.0 |
| Comparative example | | |
| A(7) | VM10: 100 pbw | |

| B. Polyol composition: | |
|---|---|
| T-3275 | 100 pbw |
| MEG | 4.4 |
| DEG | 2.0 |
| H$_2$O | 0.8 |
| D-33 LV | 0.2 |
| DBTDL | 0.2 |
| Dispersed carbon black | 5.0 |

Integral skin foams ISF$_1$ to ISF$_7$ were prepared by reacting the isocyanate composition A$_1$ to A$_7$ with the polyol composition, at an isocyanate index of 100, in a mould, upon mixing during 10 sec. at 5000 rpm.

The physical properties of the resulting integral skin foams are shown in Table II herebelow.

The integral skin foams prepared according to the present invention showed improved skin properties and a very fine cell structure, as well as improved physical properties.

EXAMPLE III

Microcellular elastomers (shoe sole) were prepared by using water as blowing agent, in combination with PFB-THF.

The microcellular elastomers were prepared by using the following ingredients (parts by weight):

| Composition | III$_a$ | III$_b$ | III$_c$ |
|---|---|---|---|
| Polyol compositions: | | | |
| PA 38 | 89.13 | 89.13 | 89.13 |
| 1,4-butane diol | 8.50 | 8.50 | 8.50 |
| Dabco EG | 2.00 | 2.00 | 2.00 |
| DBTDL | 0.02 | 0.02 | 0.02 |
| water | 0.35 | 0.35 | 0.35 |
| PFB-THF | — | 1.00 | 2.00 |
| Isocyanate: VM021 | 58 | 57.5 | 57 |
| Free rise density (kg/m³) | 240 | 215 | 195 |

The resulting microcellular elastomers showed reduced densities when prepared in the presence of PFB-THF.

EXAMPLE IV

Flexible foams were prepared by using water as blowing agent, in combination with PFP-THF, by using the following formulations (parts are by weight):

| Composition | IV$_a$ | IV$_b$ | IV$_c$ | IV$_d$ |
|---|---|---|---|---|
| Polyol compositions: | | | | |
| F-3507 | 100 | 100 | 100 | 100 |
| B 4113 | 0.8 | 0.8 | 0.8 | 0.8 |
| Dabco 33LV | 0.8 | 0.8 | 0.8 | 0.8 |
| Niax-A1 | 0.1 | 0.1 | 0.1 | 0.1 |
| H$_2$O | 4.5 | 4.5 | 5.0 | 5.0 |
| Isocyanate: VM25 | 77 | 77 | 84.5 | 84.5 |
| Penta-fluoro-2-propyl-THF (emulsified in VM25 as described in Example I) | 0 | 0.5 | 0 | 0.5 |
| Free rise density (kg/m³) | 55.3 | 52.1 | 52.3 | 52.1 |

Foams prepared with PFP-THF had extremely fine texture and soft feel as judged by tactile examination.

We claim:

1. An isocyanate-reactive composition comprising:
   a) at least one isocyanate-reactive compound of molecular weight of 1000 to 10000 and of functionality of 2 to 4, and

TABLE II

| Sample | Overall density, (kg. m$^{-3}$) | Core density, (kg. m$^{-3}$) | Short A hardness, | Indentation hardness, (kg) | Tensile strength, (KPa) | Elongation at break, (%) | Tear strength, (N. m$^{-1}$) |
|---|---|---|---|---|---|---|---|
| ISF (7) (ref.) | 266 | 245 | 28 | 7.5 | 823 | 147 | 4.8 |
| ISF (1) | — | 225 | 25 | 5.9 | 834 | 163 | 4.5 |
| ISF (2) | 256 | 223 | 26 | 6.6 | 885 | 170 | 4.9 |
| ISF (3) | 263 | 238 | 27 | 6.4 | 875 | 162 | 4.6 |
| ISF (4) | 257 | 228 | 26 | 6.6 | 885 | 167 | 4.4 |
| ISF (5) | 256 | 223 | 26 | 6.1 | 880 | 160 | 4.5 |
| ISF (6) | 267 | 243 | 26 | 6.8 | 1018 | 175 | 4.9 | b) an inert, insoluble, organic liquid which has a boiling point of at least 60° C. at 1 bar.

2. A polyisocyanate composition having an isocyanate number average functionality of 2 to below 2.4 and comprising an inert, insoluble, organic liquid having a boiling point of at least 60° C. at 1 bar.

3. An isocyanate-reactive composition according to claim 1 characterised in that the composition further comprises at least one 2 isocyanate-reactive compound having a molecular weight of at least 60 to below 1000 and a functionality of 2-8.

4. An isocyanate-reactive or polyisocyanate composition according to claim 1 characterised in that the composition further comprises a blowing agent.

5. An isocyanate-reactive or polyisocyanate composition according to claim 4 characterised in that the blowing agent comprises a compound having a boiling point of between −70° C. to 0° C. at 1 bar.

6. An isocyanate-reactive or polyisocyanate composition according to claim 5 characterised in that the blowing agent having a boiling point of between −70° C. to 0° C. is selected from the group consisting of $CHClF_2$, $CH_2F_2$, $CF_3CH_2F$, $CF_2HCF_2H$, $CH_3CClF_2$, $C_2H_4F_2$, $C_2HClF_4$ and mixtures thereof.

7. An isocyanate-reactive or polyisocyanate composition according to claim 1 characterised in that the inert, insoluble, organic liquid is a fluorinated compound.

8. An isocyanate-reactive or polyisocyanate composition according to claim 7 characterised in that the fluorinated compound is selected from the group consisting of fluorinated hydrocarbons, fluorinated ethers, fluorinated tertiary amines, fluorinated amino-ethers and fluorinated sulfones.

9. An isocyanate-reactive or polyisocyanate composition according to claim 1 characterised in that the inert, insoluble, organic liquid has a boiling point of at least 75° C. at 1 bar.

10. An isocyanate-reactive or polyisocyanate composition according to claim 1 characterised in that the composition further comprises a surfactant.

11. An isocyanate-reactive or polyisocyanate composition according to claim 10 characterised in that the surfactant is a fluorinated surfactant.

12. An isocyanate-reactive composition according to claim 4 characterised in that the blowing agent is water optionally together with a blowing agent having a boiling point of between −70° C. to 0° C. at 1 bar.

* * * * *